No. 797,615. PATENTED AUG. 22, 1905.
F. SCHMITT.
CARBURETER.
APPLICATION FILED MAR. 15, 1905.

2 SHEETS—SHEET 1.

Attest:
G. A. Pennington
B. J. Funk

Inventor:
Fred Schmitt,
by Bakewell & Cornwall
Attys.

No. 797,615. PATENTED AUG. 22, 1905.
F. SCHMITT.
CARBURETER.
APPLICATION FILED MAR. 15, 1905.
2 SHEETS—SHEET 2.
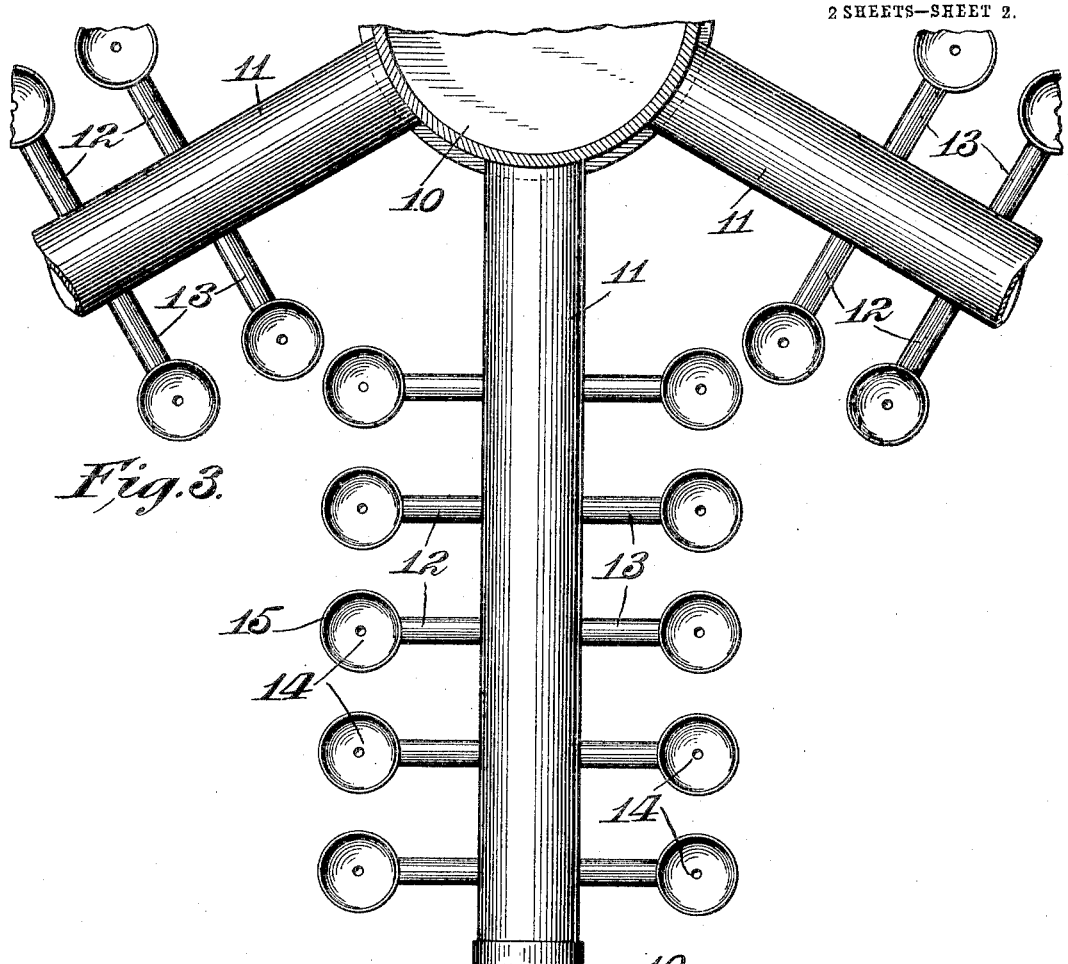
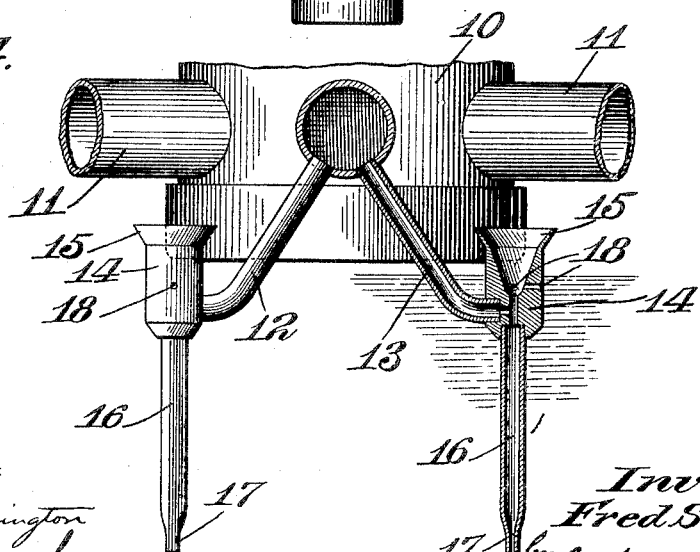
Attest:
G. A. Pennington
B. F. Fink
Inventor:
Fred Schmitt,
by Bakewell & Cornwall
Attys.

UNITED STATES PATENT OFFICE.

FREDERICK SCHMITT, OF ST. LOUIS, MISSOURI.

CARBURETER.

No. 797,615.　　　Specification of Letters Patent.　　　Patented Aug. 22, 1905.

Application filed March 15, 1905. Serial No. 250,246.

*To all whom it may concern:*

Be it known that I, FREDERICK SCHMITT, a citizen of the United States, residing at St. Louis, Missouri, have invented a certain new and useful Improvement in Carbureters, of which the following is a full, clear, and exact description, such as will enable others skilled in the art to which it appertains to make and use the same, reference being had to the accompanying drawings, forming part of this specification, in which—

Figure 1:
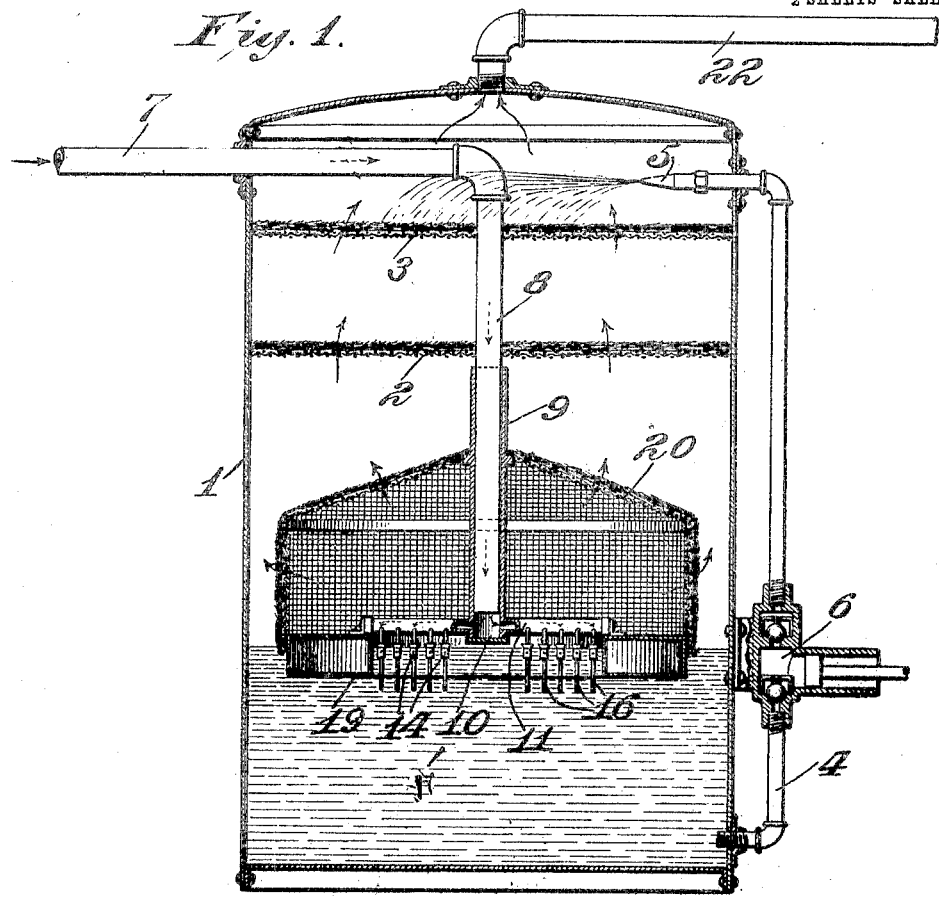
Figure 2:
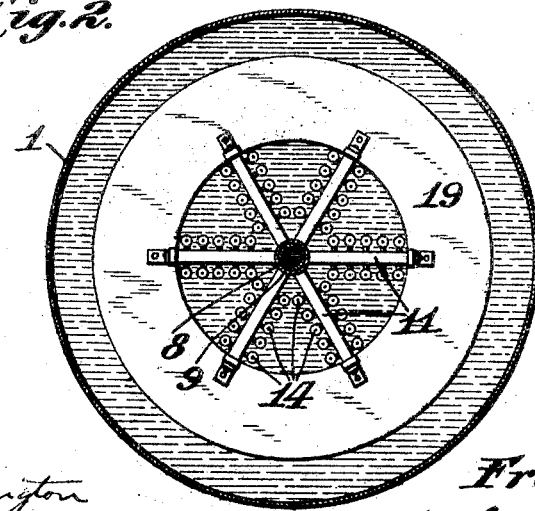

Figure 1 is a cross-sectional view through a carbureter constructed in accordance with my invention. Fig. 2 is a cross-sectional view through the carbureter immediately above the float, the vaporizing-dome being removed. Fig. 3 is a view, partly in section and partly in plan, of the atomizer. Fig. 4 is a fragmentary view of the atomizer, one of the nozzles being illustrated in section.

This invention relates to carbureters, and it is particularly adapted for carbureted air from a hydrocarbon product, such as gasolene.

One of the objects of the invention is to provide a carbureter which will facilitate the carbureting of air from a suitable hydrocarbon, whereby the resultant gas will be rich in light-giving properties and a uniform quality of carbureted air will be produced.

Another object of the invention is to provide means whereby the proper quantities of air and vapor will be intermixed to produce the gas.

Other objects and advantages, as well as the novel details of construction, of my invention will be more fully hereinafter described, it being understood that minor changes in the form, proportion, and details of construction may be resorted to without departing from the spirit of my invention or sacrificing any of the advantages thereof.

The preferred form of my invention, as illustrated in the accompanying drawings, includes a tank or receptacle 1, having near its upper portion spaced screens 2 and 3, of which there may be any suitable number. These screens are provided with suitable coverings of any absorbent material for a purpose which will be fully hereinafter brought out.

Communicating with the lower portion of the tank is a tube or pipe 4, having its discharge end in the form of a nozzle 5 at the upper portion of the tank. A pump 6 is arranged to coöperate with the tube and is in communication therewith, so that when said pump is operated the gasolene or other liquid will be drawn from the bottom of the tank and discharged in the upper portion thereof over the absorbent coverings of the screens to impregnate the gas or vapor with the hydrocarbon, and thus enrich it.

Leading from a suitable source of air-supply (not shown) is a pipe 7, which has a vertical stem 8 depending from the upper portion of the tank toward the bottom thereof. Slidably mounted on said stem is a sleeve 9, having at its lower extremity a tubular head 10, provided with a plurality of radially-disposed arms 11, which are hollow and communicate with said head and also communicate with a plurality of nozzle-supporting tubes 12 and 13, depending from said arms and having their nozzle-carrying ends disposed in directions opposite to each other. Each tube 12 or 13 carries a nozzle 14, having a flared discharge end 15. The opposite end of the nozzle is shown as being provided with a depending tube 16, the receiving end of which is slightly contracted, as at 17. In the sides of the nozzles are inlet-openings 18, which are at all times below the level of the hydrocarbon oil and are preferably maintained in such position by a float 19, on which the arms 11 rest, which float may rise and fall in the tank to properly maintain the nozzles in operative relation with the gasolene or the hydrocarbon oil. Secured to the float and tube is a dome 20, which may be composed of any reticulated material or of a wire mesh of suitable gage.

By reference to Fig. 1 it will be observed that the nozzles of the atomizers are in the gasolene or other hydrocarbon, so that by permitting the air to pass through the pipe 7, through the tubular arms, and out through the flared portions 15 of the nozzles a partial vacuum will be produced in the nozzles, so that the oil will be drawn thereinto and discharged therefrom in the form of a fine spray. As it is forced from the nozzles against the reticulated dome and passed through the covering on said dome it will gather in richness, and as it passes up through the covered screens it will absorb more of the hydrocarbon until it passes out through the supply-pipe 22 to the burners.

Having thus described the invention, what is claimed as new, and desired to be secured by Letters Patent, is—

1. In a carbureter, the combination with a tank, of an air-tube in the tank and having a depending end, atomizer-nozzles in communication with said air-tube, means for entirely enveloping the upper portions of the atomizer-nozzles, said means having a reticulated upper portion, and an exhaust-tube leading from said tank; substantially as described.

2. In a carbureter, the combination with a tank, of an air-tube in the upper portion of said tank and having a depending end, a sleeve slidably connected to said depending end and closed at one end, tubular arms carried by said sleeve, and atomizer-nozzles connected to said arms; substantially as described.

3. In a carbureter, the combination with a tank, of an air-tube in the upper portion of said tank and having a depending end, a sleeve slidably connected to said depending end and closed at one end, tubular arms carried by said sleeve, atomizer-nozzles connected to said arms, and a float for maintaining the nozzles at the proper depth in the hydrocarbon oil; substantially as described.

4. In a carbureter, the combination with a tank, of an air-tube in the upper portion of said tank and having a depending end, a sleeve slidably connected to said depending end and closed at one end, tubular arms carried by said sleeve, atomizer-nozzles connected to said arms, and a reticulated dome above and movable with the nozzles; substantially as described.

5. In a carbureter, the combination with a tank, of a float in said tank, atomizer-nozzles carried by said float, an air-tube in communication with said atomizer-nozzles, and a reticulated dome carried by and movable with said float; substantially as described.

6. In a carbureter, the combination with a tank, of a pipe in the upper end of the tank and having a depending portion, radial arms in communication with said depending portion, atomizer-nozzles carried by said radial arms, and also in communication with said depending portion of said tube, a reticulated dome above the atomizer-nozzles, and a pump outside of the tank and having its intake at the lower portion of the tank and its discharge end at the upper portion and within the tank; substantially as described.

In testimony whereof I hereunto affix my signature, in the presence of two witnesses, this 11th day of March, 1905.

FRED. SCHMITT.

Witnesses:
B. F. FUNK,
GEORGE BAKEWELL.